(12) United States Patent
Okada

(10) Patent No.: US 7,324,237 B2
(45) Date of Patent: Jan. 29, 2008

(54) IMAGE RECORDING APPARATUS CORRECTING THE IMAGE RECORDING POSITION BASED ON THE DETECTED RESULT OF THE RECORDING MATERIAL

(75) Inventor: Koichi Okada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 691 days.

(21) Appl. No.: 09/989,376

(22) Filed: Nov. 21, 2001

(65) Prior Publication Data

US 2002/0060817 A1 May 23, 2002

(30) Foreign Application Priority Data

Nov. 22, 2000 (JP) ............... 2000-356186

(51) Int. Cl.
*G06F 15/00* (2006.01)
(52) U.S. Cl. ............ 358/1.18; 358/1.18; 347/129; 347/139; 347/179; 347/184; 347/185; 347/186; 347/187; 347/197; 347/198; 347/215; 399/394; 399/395
(58) Field of Classification Search ........... 358/1.12, 358/1.15, 3.26, 505, 1.18; 347/129, 139, 347/179, 184, 185, 186, 187, 197, 198, 215; 399/394, 395
See application file for complete search history.

(56) References Cited

U.S. PATENT DOCUMENTS 5,041,850 A * 8/1991 Kahoyashi et al. ......... 347/157
5,140,340 A * 8/1992 Stephenson ................ 347/177
6,340,984 B1 * 1/2002 Ui et al. .................... 347/139
6,385,944 B1 * 5/2002 Taniguchi et al. ........... 53/168

FOREIGN PATENT DOCUMENTS

| JP | 61-093772 A | 5/1986 |
|---|---|---|
| JP | 05-306044 A | 11/1993 |
| JP | 07-329359 A | 12/1995 |
| JP | 08-094345 A | 4/1996 |
| JP | 10-181127 A | 7/1998 |

* cited by examiner

*Primary Examiner*—Twyler Lamb
*Assistant Examiner*—Vu Hang
(74) *Attorney, Agent, or Firm*—Sughrue Mion, Pllc.

(57) ABSTRACT

This invention relates to an image recording apparatus provided with a transporting unit transporting an image recording material whose shape has at a least one side in a predetermined transporting direction; an image recording position detecting unit detecting a position of the at least one side along the predetermined transporting direction, an image recording position correcting unit correcting the image recording position for the image recording material based on result of detection of the at least one side by said image recording position detecting unit; and an image forming unit forming a predesired image on the image recording material at the corrected image recording position.

28 Claims, 3 Drawing Sheets

IMAGE RECORDING APPARATUS CORRECTING THE IMAGE RECORDING POSITION BASED ON THE DETECTED RESULT OF THE RECORDING MATERIAL

BACKGROUND OF THE INVENTION

The present invention relates to an image recording apparatus. More specifically, the present invention relates to an image recording apparatus for recording an image on an image recording material being transported.

Recently, thermal image recording technology using thermal recording materials comprising a thermal recording layer formed on a rectangular substrate such as paper or film is used to record, for example, the images produced in diagnosis by ultrasonic scanning. This recording method, commonly referred to as thermal image recording, eliminates the need for wet development processing and offers several advantages including convenience in handling. Hence, the use of the thermal image recording system is not limited to small-scale recording applications such as diagnosis by ultrasonic scanning, and an extension to those areas of medical diagnoses such as CT, MRI, and X-ray photography in which large and high quality images are required, is under review.

As known, in the thermal image recording, an image is recorded by heating the thermal recording layer of a thermal recording material using a thermal head having a glaze in which heat generating elements corresponding to the number of pixels of one line are arranged in one direction. More specifically, the thermal image recording is performed in such a manner that the respective heat generating elements of the glaze are heated in accordance with the image data of the image to be recorded while moving the glaze and the thermal recording material relative to each other in a direction approximately perpendicular to the direction in which the heat generating elements are arranged, with the glaze a little pressed against the thermal recording layer of the thermal recording material.

Incidentally, it is ordinarily necessary not only in the thermal printer but also in the image recording apparatus to appropriately transport an image recording material on which an image is recorded in a predetermined transporting direction because the image is recorded on the image recording material which is being transported. The transporting direction of the image recording material being transported is corrected by pressing a side thereof against a guide along the predetermined transporting direction.

This method can be performed with a relatively simple arrangement. However, when the image recording material is thin and liable to be flexed, a problem arises in that the image recording material is deformed and an image cannot be correctly recorded thereon. Although the transporting direction can be corrected with a correction mechanism arranged relatively simply, there is also a problem that it is time-consuming to adjust the correction mechanism because the mechanism is arranged mechanically.

An object of the present invention, which was made in view of the above circumstances, is to provide an image recording apparatus having an image recording material alignment function which can solve the above problems of the conventional art, which does not deform an image recording material even if it is thin and liable to be flexed, and the adjustment of which is not time-consuming.

SUMMARY OF THE INVENTION

In order to attain the above object, following aspects will be provided by the present invention.

The first aspect of the present invention is characterized in that an image recording apparatus has an image recording unit which records an image on an image recording material; a transporting unit which transports the image recording material whose shape has at a least one side in a predetermined transporting direction; an image recording position detecting unit which detects a position of the at least one side along the predetermined transporting direction; an image recording position correcting unit which corrects the image recording position for the image recording material based on result of detection of the at least one side by the image recording position detecting unit; and an image forming unit which forms a desired image on the image recording material at the corrected image recording position Preferably, the image recording position correcting unit is provided with a unit which rearranges said image data.

The second aspect of the present invention is characterized in that an image recording apparatus has an image recording unit which records an image on an image recording material; a transporting unit which transports the image recording material whose shape has at least two sides being opposite in a predetermined transporting direction; an image recording position detecting unit which is arranged at positions at least two sides along a predetermined transporting direction, and which detects an image size based on positions of the at least two sides along the predetermined transporting direction; an image recording position correcting unit which corrects the image recording position for the image recording material based on result of detection by the image recording position detecting unit; and an image forming unit which forms a desired image on the image recording material at the corrected image recording position. Preferably, the image recording position correcting unit is provided with a unit which rearranges said image data.

The third aspect of the present invention is characterized in that an image recording apparatus has an image recording unit which records an image on an image recording material; a transporting unit which transports the image recording material whose shape is rectangular in a predetermined transporting direction; an image recording position detecting unit which detects an inclination of the image recording material based on positions of the at least two sides along the predetermined transporting direction; an image recording position correcting unit which corrects the image recording position for the image recording material based on result of detection by the image recording position detecting unit; and an image forming unit which forms a predesired image on the image recording material at the corrected image recording position. Preferably, the image recording position correcting unit is provided with a unit which rearranges said image data.

Here it is preferable in the above aspects that the image recording position detecting unit detecting an inclination with relative to the transporting direction of the image recording material during transporting from a plurality of portions along the side obtained using the image recording position detecting unit and the image recording position correcting unit correcting a present position of the image recording material depending on the inclination.

Further it is preferable therein that the position detecting unit has a laser length measuring unit.

Furthermore it is preferable therein that the position detecting unit has a transmission-type detecting unit or a reflection-type optical detecting unit.

Furthermore it is preferable therein that the position detecting unit has a potentiometer provided with a lever capable of rotating around a shaft.

Furthermore it is preferable therein that the image recording material is a rectangular and/or flexible film.

Furthermore it is preferable that therein that the image recording apparatus is a thermal printer or a laser printer.

DETAILED DESCRIPTION OF THE INVENTION

An embodiment of the present invention will be described below in detail with reference to the accompanying drawings.

Figure 1:
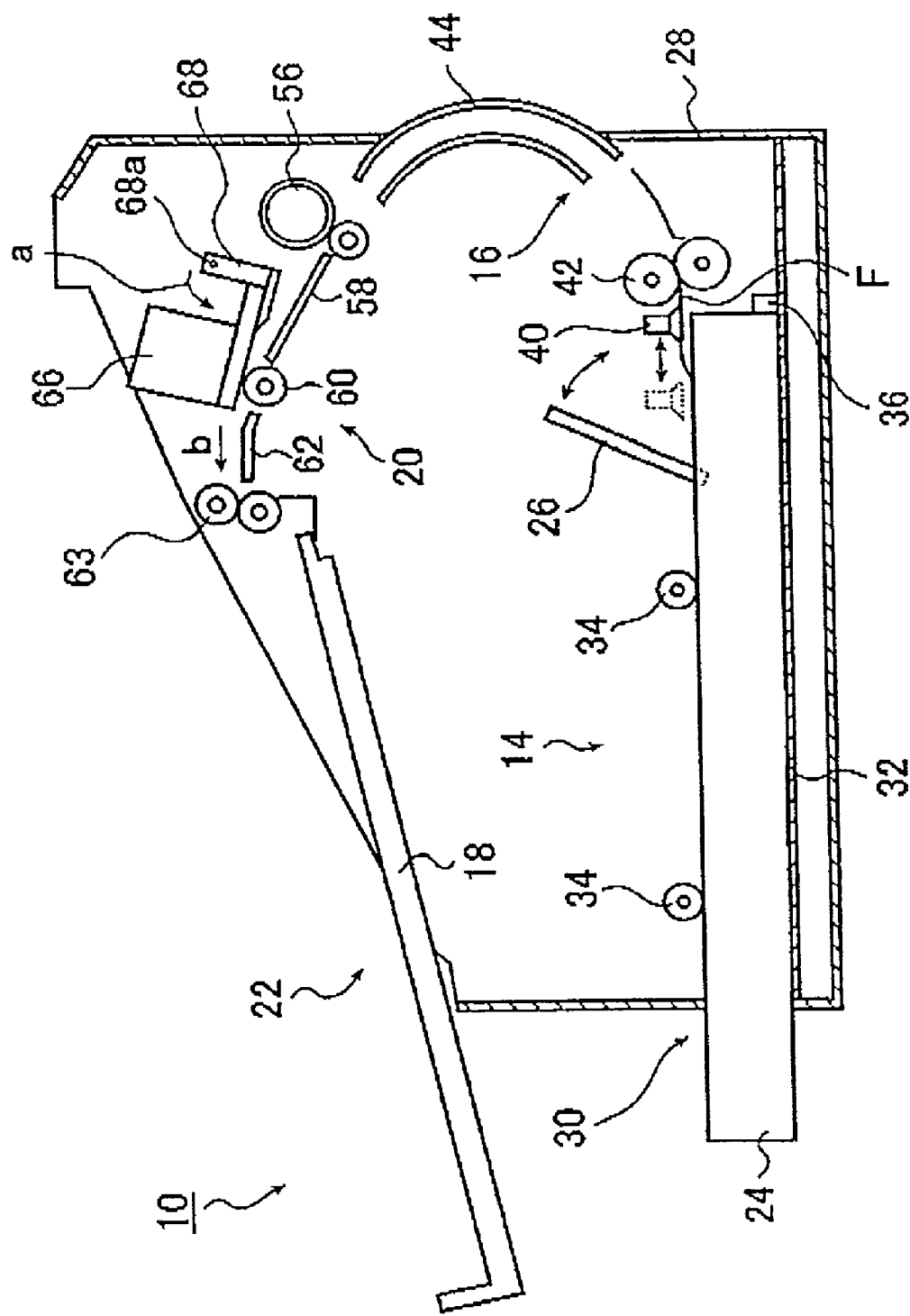
FIG. 1 is a view showing the schematic internal arrangement according to an embodiment of the present invention.

FIG. 1 is a side view showing the schematic arrangement of a thermal printer (hereinafter, referred to as a "thermal printer according to the embodiment") in which a recording material position detecting and image recording position correcting function according to the embodiment of the present invention is assembled. The illustrated thermal printer 10 performs thermal image recording on thermal recording materials such as thermal recording films (hereinafter, referred to simply as "films") F having a given size such as a legal size or a letter size whose shape is rectangular.

As shown in FIG. 1, the thermal printer 10 according to the present invention includes a loading unit 14 where a magazine 24 containing films F is loaded, a feed/transporting unit 16 disposed in the thermal printer 10, a recording unit 20 for performing thermal image recording to the films F by a thermal head 66 (including a cooling fan in FIG. 1), and an outlet unit 22.

As described above, the direction in which a film F is transported is conventionally corrected by a transporting direction correcting mechanism disposed in a transporting path ranging from the loading unit 14 to the recording unit 20, that is, using a mechanism for pressing a side of an image recording material being transported against a guide disposed along a predetermined transporting direction. However, the thermal printer 10 according to the present embodiment is characterized in that the position of an image recording material where an image is to be recorded is corrected based the result of detection of the position of the film F detected by a film position detecting unit disposed in the transporting path, in place of correcting the direction in which the film F is transported.

That is, the thermal printer 10 according to the present embodiment is carried out by the film position detecting unit including a plurality of film F position detecting units disposed in the transporting path from the loading unit 14 to the recording unit 20 and an image recording position correcting unit for correcting the position of the image recording material where an image is to be recorded based on the result of detection of the position of the film F detected by the film P position detecting units, as described later.

The films F respectively has a substrate consisting of a transparent film such as a transparent polyethylene telephthalate (PET) film, one surface of which is overlaid with a thermal recording layer. The films F are arranged as a stacked member formed by a given unit of, for example, about 100 sheets and accommodated in the magazine 24 in the form of a film package, and they are taken out of the magazine 24 one by one so as to be used for thermal recording, as described below.

The loading unit 14 has a magazine inlet 30 formed in the housing 28 of the thermal printer 10, a guide/support plate 32, guide rolls 34, 34, and a stopper 36. The magazine 24 is inserted into the thermal printer 10 from the magazine inlet 30 of the loading unit 14 in such a way that t portion fitted with the cover 26 of the magazine 24 is coming first; thereafter, the magazine 24 as it is guided by the guide/support plate 32 and the guide rolls 34, 34 is pushed until it is in contact with the stop member 36; thereupon it is loaded at a specific position of the thermal printer 10.

The feeding/transporting unit 16 has a sheet feeding mechanism using a sucker 40 for grabbing a film F by application of suction, a transporting unit 42, a transporting guide 44, and a cleaning roller pair 56 located in the outlet of the transporting guide 44; the films F are taken out of the magazine 24 in the loading unit 14 and transported to the recording unit 20.

The transporting unit 42 is formed by a transporting roller and a nip roller pressed against the transporting roller. The cleaning roller pair 56 is a roller pair formed by a tacky rubber roller and an ordinary roller that are used to eliminate dusts and the like deposited on the films F.

When a signal for the start of recording is issued, the cover 26 of the magazine 24 is opened by a cover open/close mechanism (not shown) in the thermal printer 10. Then, the sheet feed mechanism using the sucker 40 picks up one sheet of the films F from the magazine 24 and feeds the forward end of the sheet between the transporting roller and the nip roller of the transporting unit 42. At the point of time when the film F is pinched between the transporting roller and the nip roller, the sucker 40 releases the film, and the thus fed film F is transported along the transporting guide 44.

At the point of time when the film F to be used in recording is completely taken out from the magazine 24, the cover open/close mechanism closes the cover 26. The distance between the transporting unit 42 to the cleaning roller pair 56 which is defined by the transporting guide 44 is set somewhat shorter than the length of the film F in the direction in which it is transported so that the advancing end of the film F, which is transported by the transporting unit 42, reaches the cleaning roller pair 56.

The cleaning roller pair 56 may stop at first so that the advancing end of the film F stop there once. That is, this is a system arranged such that the temperature of the thermal head 66 is checked when the advancing end of the film F reaches the cleaning roller pair 56, and if it is at a specified temperature, the cleaning roller pair 56 resumes to transport the film F at that time, which is transported to the recording unit 20.

In contrast, in a system in which the cleaning roller pair 56 is not stopped, it is checked beforehand (for example, at the time when the signal for the start of recording to the film F is issued) that the temperature of the thermal head 66 has reached the specified temperature, whereby the transportation of the film F is continued so that it is fed to the recording unit 20.

The recording unit 20 is formed by the thermal head 66, a platen roller 60, the cooling fan (not shown) for cooling the thermal head 66, a guide 58, a guide 62, and a film ejection roller pair 63.

The thermal head 66 performs thermal image recording at recording (pixel) density of, for example, 300 dpi. The thermal head 66 has a thermal head main body having a glaze formed thereon, in which heat generating elements for performing one line thermal recording on the film F are arranged in one direction, and a heat sink fixed to the thermal head main body. The thermal head 66 is supported on a support member 68 that can pivot about a fulcrum 68a either in the direction of an arrow a or the reverse direction.

The platen roller 60 rotates at a specified image recording speed, holding the film F in a specified position, and transports the film F in the direction (sub-scanning direction) substantially perpendicular to the direction in which the glaze extends (main scanning direction).

Before the film F is transported to the thermal head 66, the support member 68 is pivoted upward (in the direction opposite to the direction of the arrow a) so that the glaze of the thermal head 66 is not in contact with the platen roller 60. When the transportation of the film F by the cleaning roller pair 56 starts, it is transported while being guided by the cleaning roller pair 56 and the guide 58.

When the end of the film F reaches the record start position (i.e., corresponding to the glaze), the support member 68 pivots in the direction of the arrow a, and the film F becomes pinched between the glaze of the thermal head 66 and the platen roller 60 such that the glaze is pressed onto the recording layer. Then, the film F is transported in the direction of an arrow b while it is held in a specified position by the platen roller 60.

In synchronization with the transportation of the film F, the respective heat generating elements on the glaze are actuated image-wise in accordance with an image to be recorded so that thermal image recording is performed on the film F. on the completion of the thermal image recording, the film F as it is guided by the guide 62 is transported by the platen roller 60 and the film ejection roller pair 63 and ejected into a tray 18 in the outlet unit 22 disposed above the thermal printer 10.

The thermal printer 10 according to the embodiment is basically arranged as described above and operates as described above Next, the arrangement and operation of a film F position detecting and image recording position correcting function, which is a characteristic arrangement of the thermal printer 10 will be described in detail.

Figure 2:
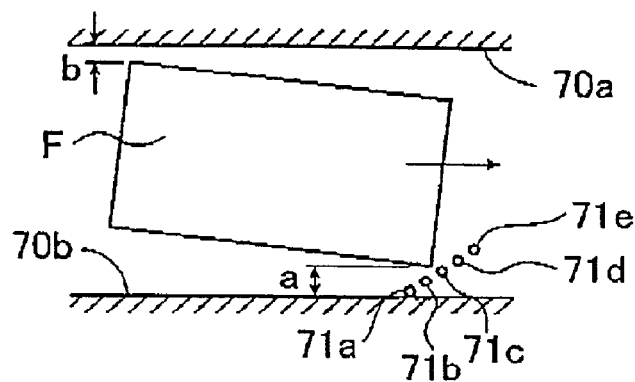
FIG. 2 is a view showing an example of a film position detecting unit used in the thermal printer shown in FIG. 1.

FIG. 2 is a view showing an example of the arrangement of a film position detecting sensor acting as a specific example of a recording material position detecting function that is a characteristic arrangement of the thermal printer 10 according to the embodiment. In this arrangement, reflection type infrared sensors are disposed at a pitch of 1 millimeter on a side in the recording unit 20 along the transporting direction of the film F transporting path in the range of several millimeters in the right and left directions such that the positional offset and skew of the film F in the transporting path can be detected.

More specifically, in the thermal printer 10 according to the embodiment, the width of the transporting path is set about 5 millimeters wider than the standard width of the film F, and further no special unit for forcibly correcting the position of the film F, for example, a side guide mechanism is not provided with the thermal printer 10. Accordingly, the position of an image to be recorded on the film F is corrected using a software technology in a sense.

In FIG. 2, reference numerals 70a and 70b denote guides that constitute the transporting path, reference numerals 71a, 71b, 71c, . . . denote film detecting units each formed by, e.g., an infrared ray projector and receiver. In this example, intervals of a and b exist between the guides 70a and 70b and both the right and left sides of the film F, respectively as shown in FIG. 2. As described above, the total size of the intervals of a and b is about 5 millimeters, as described above. It is noted that though mere five film detecting units are arranged in FIG. 2, a number of the film detecting units is not limited. Namely, not only five number but also more or less number of the film detecting units are available, in the present invention.

Further, the heat generating elements are disposed on the thermal head 66 in a size that is set about 5 millimeters, which is a value corresponding to the above margin, longer than the width of the film F. Accordingly, it is preferable to determine the intervals between the film detecting units 71a, 71b, 71c, . . . in the direction perpendicular to the film P transporting direction in consideration of the length of the thermal head 66.

While the intervals between the film detecting units 71a, 71b, 71c, . . . in the direction perpendicular to the film F transporting direction are set to 0.5 millimeter here, it is only an example, and it is needless to sat that the film detecting units 71a, 71b, 71c, . . . may be disposed more minutely, that is, at narrower intervals. Inversely, the intervals may be set somewhat wider than the above-mentioned.

Figure 3:
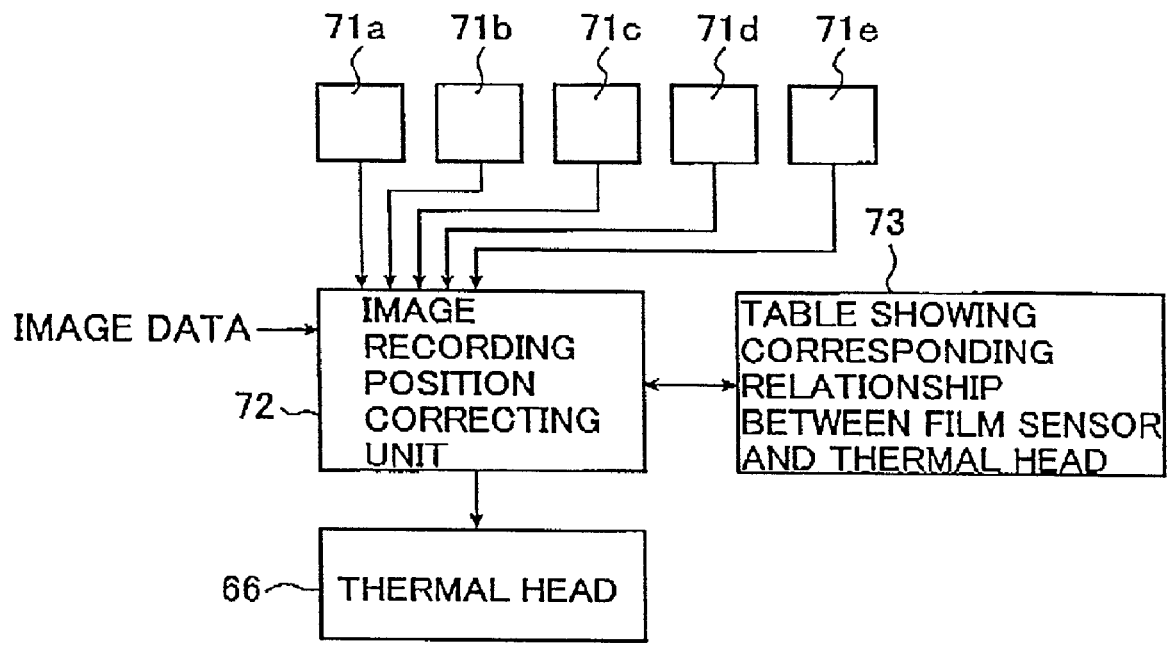
FIG. 3 is a block diagram schematically showing an image recording position correcting unit.

The film detection signals issued from the film detecting units 71a, 71b, 71c, . . . of the thermal printer 10 according to the embodiment arranged as described above are input to an image recording position correcting unit 72 which is as shown in FIG. 3. The image recording position correcting unit 72 calculates the position of the film F based on the information showing whether or not the film F is detected by the respective film detecting units 71a, 71b, 71c, . . . .

The position of the film F is calculated based on the information indicating whether or not the film F is detected by the respective film detecting units 71a, 71b, 71c, . . . that correspond to the leading portion of the film F. That is, when the film detecting units 71a and 71b do not detect the film F and the film detecting units 71c, 71d, . . . detect the film F, it is calculated that the size of the interval a is substantially 1 millimeter.

Then, when the displaced position of the film F has a value larger than a preset value, the image recording position correcting unit 72 changes the output range of the image data of an image to be recorded, which is output to the heat generating elements of the thermal head 66, and corrects the position of the image to be recorded on the film F. This processing can be easily realized by referring to a table 73 in which the corresponding relationship between the patterns detected by the film detecting units and the output ranges of image data to be output to the heat generating elements of the thermal head 66 is previously stored.

Namely, in the embodiment, when a positional displacement of the film F in the transporting path is small, the image recording position correcting unit 72 changes an initial position on which an image is recorded, depending on an amount of the positional displacement of the film A, so that a desired image is set not to be off from a preferable image forming area on the film F.

While the above embodiment shows an example in which only the positional offset of the film F in the transporting path, it is also possible to calculate the inclination of the film F and to cope with the inclination as another arrangement of the image recording apparatus. In this case, the inclination of the film F can be calculated based on the information indicating whether or not the film F is detected by the respective film detecting units 71*a*, 71*b*, 71*c*, . . . that are disposed at a plurality of positions in the transporting direction of the film F.

More specifically, when the film detecting units 71*a* and 71*b* do not detect the film F and the film detecting units 71*c*, 71*d*, . . . detect the film F at a certain measuring time, and when the film detecting units 71*a*, 71*b*, and 71*c* do not detect the film F and the film detecting units 71*d*, 71*e*, . . . detect the film F at the next measuring time, it can be detected that the film F has an inclination.

When the inclination exceeds a preset value, necessary processing is performed also in this case by the image recording position correcting unit 72. As the processing, the location of the heat generating elements of the thermal head 66 where they are used, may be changed as described above. The image data are rearranged depending on the inclination thereby recording the image on a predetermined position (initial position or original position) of the film F. In addition to this processing, processing can also be performed that slightly tilts the attitude of the thermal head 66 on a horizontal plane in accordance with the direction of the inclination.

According to the embodiment, an amount of positional displacement of the film F is detected. The image recording position correcting unit 72 can properly correct the image recording position depending on an extent of the positional displacement. Thus, there can be obtained an advantage of realizing an image recording apparatus which has such an image recording material alignment function that an image recording material is not deformed even if it is thin and liable to be flexed and the adjustment of the function is not time-consuming.

Figure 4:
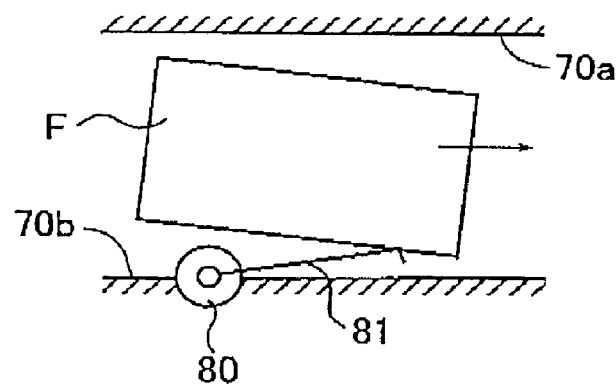
FIG. 4 is a view showing another example of the film position detecting unit.

FIG. 4 shows an example of the arrangement of a film position detecting unit acting as another embodiment of the present invention. The embodiment employs a potentiometer 80 to which an actuator lever 81 is attached as the film position detecting unit. In this film position detecting unit, when the position of the film F changes in the transporting path, the actuator lever 81 tilts in accordance with the change of the position. The film position detecting unit utilizes changing of the voltage output from the potentiometer 80.

The result detected by the film F position detecting unit using the potentiometer 80 can be directly output as the position of the film F. Thus, the above processing can be performed based on the output result.

Since various types of units can be used as the film position detecting unit, the present invention is not limited to the film position detecting units arranged as described above. For example, a laser length measuring unit is available therefore.

That is, since the above embodiments carry out only examples of the present invention, the present invention is by no means limited to thereto and it goes without saying that various improvements and modifications can be made within the range which does not depart from a gist of the present invention.

For example, the position detecting unit is arranged at a position where two sides being opposite along the transporting direction of the film F can be detected. The position detecting unit detects a size of the transporting image recording material. A correcting unit can be arranged, which corrects a position where an image is recorded on the film F based on the detection result by the position detecting unit.

Additionally, e.g., an embodiment of the present invention is not limited to application of thermal (direct) recording using a thermal printer such as above-mentioned. Namely, the other embodiment of the present invention can preferably be carried out as modification.

Figure 5:
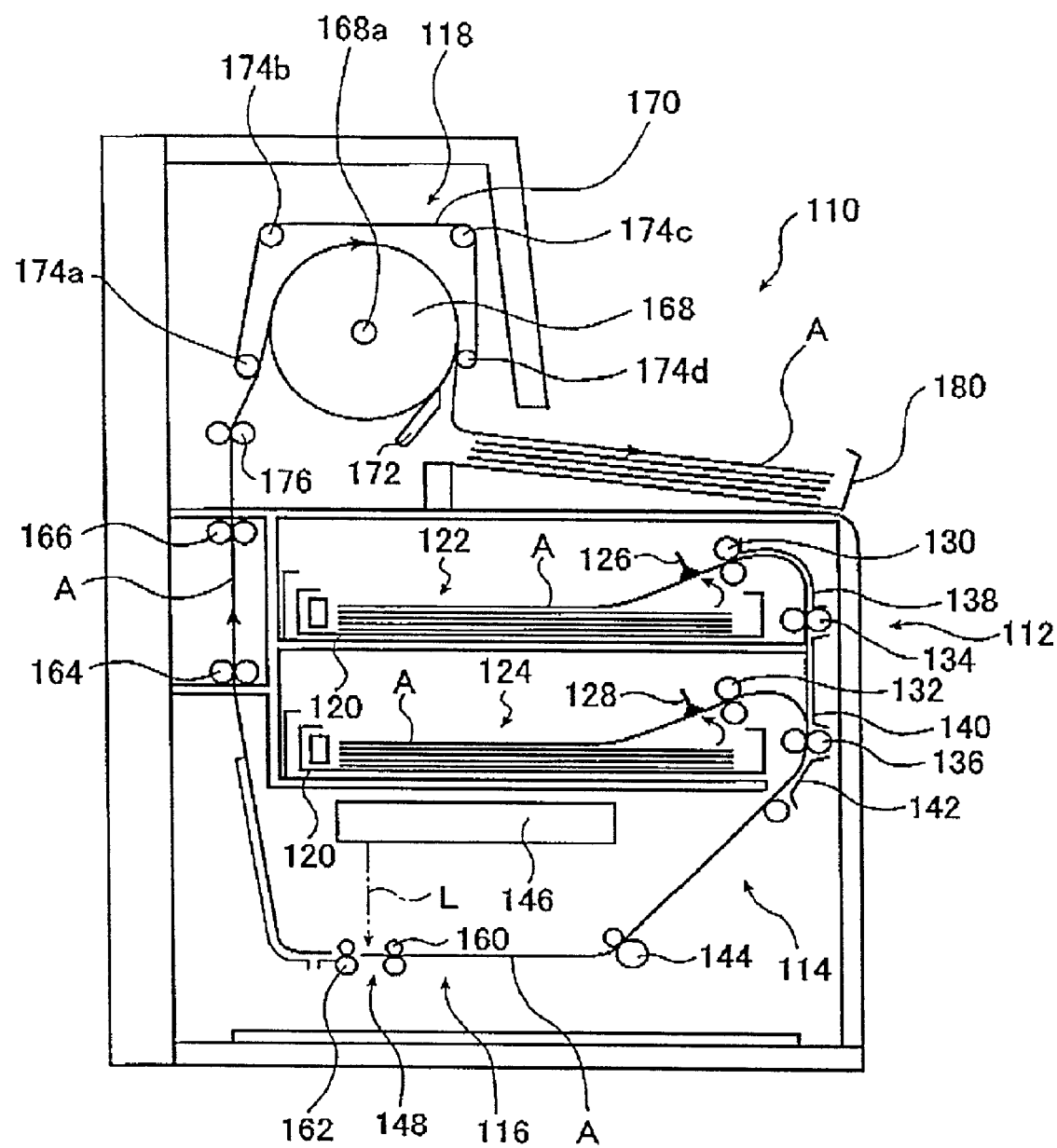
FIG. 5 is a view showing the schematic internal arrangement according to the other embodiment of the present invention.

FIG. 5 shows an embodiment of the image forming apparatus using the thermal developing apparatus of the invention. The image forming apparatus generally indicated by 110 in FIG. 5 uses a film A having a light-sensitive thermally developable image forming layer formed on a support such as a PET film (such material is hereinafter referred to simply as "film A") and after a latent image is recorded on the film A by exposing it image-wise to an optical beam L modulated in accordance with image data supplied from an image data supply source R (also see FIG. 2) such as magnetic resonance imaging (MRI) instrumentation, the exposed film A is thermally developed to form color, thereby outputting a hard copy with a formed image.

The film A that can be developed thermally with the thermal developing apparatus of the invention to be used in the thermal developing unit of the image forming apparatus 110 may be selected from various films of thermal development (thermal color formation) type that permit the recording of a latent image by exposure. Examples include a film having an image forming layer in which at least 50% of the binder is composed of a latex and which contains an organic silver salt and its reducing agent, a film having an image forming layer containing heat-responsive microcapsules incorporating an electron donating colorless dye, a compound having both an electron receiving portion and a polymerizable vinyl monomer portion in the same molecule and a photopolymerization initiator, and a film having an image forming layer containing heat-responsive microcapsules incorporating an electron donating colorless dye, an electron accepting compound, a polymerizable vinyl monomer and a photopolymerization initiator. Other films that are suitable for use in the present invention are described in JP 3-87827 A and JP 4-211252 A which are Japanese Laid-open application.

The image forming apparatus 110 which uses the above-described film A to produce prints (hard copies) having a visible image formed in accordance with the image data supplied from the image data supply source R basically comprises, in the order of transport of the film A, a film supply unit 112, a film position detecting unit 114, an image exposing unit 116, a thermal developing unit 118 that uses the thermal developing apparatus of the invention, and a delivery tray 180.

FIG. 5 is a simplified view and does not show all components of the image forming apparatus 110 for the sake of clarity. It should, however, be noted that in addition to the components shown in FIG. 5, transport rollers and guides for transporting the film A and various kinds of sensors may be provided as needed in the image forming apparatus 110

The film A is typically in the form of a stack (bundle) of a specified number of sheets, e.g., 100 numbers of sheets which are contained in a bag, bound with a strap or otherwise packaged. The stack is contained in a dedicated magazine 120, from which individual sheets are supplied into the image forming apparatus 110 and subjected, one by one, to image formation.

The film supply unit 112 is a site at which a sheet of the film A is taken from the magazine 120 and supplied to the film position detecting unit 114 located downstream the transport of the film A (this is what is meant by the term "downstream" as used hereinafter) and it comprises two loading units 122 and 124, sheet feeding means using suckers 126 and 128 and supply roller pairs 130 and 132 that are arranged in the loading units 122 and 124, respectively, transport roller pairs 134 and 136, and transport guides 138, 140 and 142.

The loading units 122 and 124 are sites at which the magazines 120 each containing the film A are loaded in specified positions. The illustrated image forming apparatus 110 has two loading units 122 and 124, which are loaded with magazines 120 that usually contain different sizes of film A [e.g., 356×432 mm for use in CT and MRI and a predetermined size of 257×364 mm for use in FCR (Fuji Computed Radiography)].

The sheet feeding means provided in the loading unit 122 (or 124) sucks the film A in position by means of the sucker 126 (or 128), transports it by moving the sucker 126 (or 128) by a known moving means such as a link mechanism and supplies it into the transport roller pair 130 (or 132) that is provided in the respective loading unit 122 (or 124). The film A supplied into the supply roller pair 130 is transported to the downstream film position detecting unit 114 by means of the transport roller pairs 134 and 136 as it is guided by the transport guides 138, 140 and 142 whereas the film A supplied into the supply roller pair 132 is transported to the downstream film position detecting unit 114 by means of the transport roller pair 136 as it is guided by the transport guides 140 and 142.

The film position detecting unit 114 is for detecting displacement and skew (inclination) of the film A transported by the image exposing unit 116, having the above-mentioned configuration in FIG. 2.

Namely, also in the image forming apparatus 110 of the modified embodiment, the width of the transporting path is set so as to be by 5 mm wider than a standard width of the film A, like the above-mentioned embodiment. Further, the image forming apparatus 110 does not have no specific mechanical unit which compulsorily corrects a position of the film A but has a unit which properly corrects a position of an image to be recorded on the film A such as an initially recording position in a software manner, using a method of correcting this position of the image to be recorded thereon.

The image exposing unit 116 (which is hereinafter referred to as the "exposing unit 116") is a site at which the film A is exposed image-wise by exposure to scanned optical beams and it comprises an exposing unit 146 and an auxiliary scanning transport means 148.

The exposing unit 146 is a known optical beam scanner with which an optical beam L modulated in accordance with the image to be recorded is deflected in the main scanning direction (normal to the paper of FIG. 5) and allowed to be incident in the specified recording position X. Having this function, the exposing unit 146 comprises a light source 150, an exposure control device 152 for driving the light source 150, a data processing unit, a polygonal mirror 54 which is a light deflector, an fθ lens 156 and a bend-down mirror 158 and so on.

Besides these components, the exposing unit 146 optionally has various members that are commonly used in an optical beam scanner such as a collimator lens and a beam expander that shape the light beam L issuing from the light source, tilt correcting optics and an optical path changing mirror.

Image data from the image data supply source R such as MRI or CT instrumentation is sent to the data processing unit, where the supplied image data is subjected to necessary processing such as calibration-dependent correction before it is supplied to the exposure control device.

The exposure control device, which drives the light source in accordance with the received image data, i.e., the image to be recorded, so that it issues the optical beam L modulated in accordance with the image data.

In the image forming apparatus 110, the optical beam L is modulated by a known method such as pulse (width or numbers) modulation or intensity modulation. In the illustrated case, direct modulation, or modulation by drive of the light source with the exposure control device, is performed to modulate the optical beam L in accordance with the image to be recorded. This is not the sole method to be employed and external modulation may be performed using a spatial modulating device such as an AOM (acoustic-optical modulator), an EOM (electro-optical modulator) or a liquid-crystal shutter array.

The thus modulated optical beam L from the light source is deflected in the main scanning direction with the polygonal mirror, adjusted with the fθ lens to be imaged at the recording position X, has its optical path altered by the bend-down mirror and is allowed to be incident at the recording position X.

Here, when an image is exposed using the above-mentioned image exposing unit 116, the image forming apparatus 110 calculates a position of the film A depending on whether or not the film exists by the film position detecting unit 114, using the image recording position correcting unit. If the calculated position of the film A lies in any portion except for a predetermined allowable position, a drawing area of the light beam L is changed based on image data of image to be recorded, and a position where an image is recorded on the film A is corrected.

The illustrated image forming apparatus 110 is intended to perform monochromatic image recording and the exposing unit 146 has only one light source. If the present invention is to be used in recording a color image, one should use an exposing unit having three light sources that emit optical beams at wavelengths dependent on the spectral sensitivity characteristics R (red), G (green) and B (blue) of a color light-sensitive material.

The auxiliary scanning transport means 148 comprises two transport roller pairs 160 and 162 positioned on opposite sides of the recording position X (scanning line) and the film A, as it is held in the recording position X, is transported in an auxiliary scanning direction normal to the main scanning direction by means of the transport roller pairs 160 and 162. As already mentioned, the optical beam L modulated in accordance with the image to be recorded has been deflected in the main scanning direction, so the film A is exposed by two-dimensional scanning with the optical beam, thereby recording a latent image.

With the latent image being thusly recorded in the image exposing unit 116, the film A is then transported upward by means of transport roller pairs 164 and 166 and so forth to be fed into the thermal developing unit 118. The thermal developing unit 118 is a site where the thermal developing apparatus of the present invention is used such that a heating drum as heating means heats the film A to perform thermal development for making the latent image visible. Having this function, the thermal developing unit 118 comprises a heating drum 168, an endless belt 170, a stripping finger 172, support rollers 174*a* to 174*d* for the endless belt 170, and an inlet roller pair 176.

The heating drum 168 has a heating source, for example a light source such as a halogen lamp or other heating source such as an electric heater built in for heating purposes. The drum has its surface heated or held by a known means at a temperature that is determined by the temperature for thermal development of the film A and it also rotates about the shaft 68*a*.

The endless belt 170 is supported and stretched between the four support rollers 174*a*, 174*b*, 174*c* and 174*d* so that it is pressed into wrapping engagement with the heating drum 168. Thus, the endless belt 170 runs synchronously along with the rotation of the heating drum 168 so that it cooperates with the latter to pinch and transport the film A.

The stripping finger 172 is used to strip the film A from the heating drum 168. To this end, the stripping finger 172 is adapted to either make light contact with the heating drum 168 or depart from it as determined by the timing of transport of the film A along with the rotation of the heating drum 168.

After being fed into the thermal developing unit 118 by means of the transport roller pair 166, the film A is pinched and transported by the inlet roller pair 176 so that it is fed into the space between the heating drum 168 and the endless belt 170. As the heating drum 168 rotates, the film A pinched between the heating drum 168 and the endless belt 170 is transported with it being held in close contact with the heating drum 168, so that it is thermally developed by the heat from the drum 168, whereupon the latent image formed by exposure becomes visible.

When the advancing end of the film A has come close to the stripping finger 172, the latter contacts the heating drum 168 lightly and gets into the space between the heating drum 168 and the film A so that the latter separates from the former.

Then, the thermal development by the heating drum 168 is completed. The film A stripped from the heating drum 168 using the stripping finger 172 is transported to outside of the image forming apparatus 110 and gone out for a tray 180, as a hard copy on which an image is formed.

In the above-mentioned modification, an example has been explained which can detect displacement of the film A in the transporting path. However, inclination of the film A on the transporting path with relative to the transporting direction can also be calculated. In such a case, when the inclination is over a predetermined value, then the scanning direction of the optical beam L can a little be inclined in a horizontal plane depending on the inclination. Further, in the case, the image recording position correcting unit 72 rearranges image data depending on the inclination, so that a desired image can be recorded on a predetermined position (initially recording position or originally recording position) of the film A.

Further in the above image forming apparatus, even when the film A is thin and flexible, an image forming apparatus can be realized which can handles such characteristic of the film A.

Further as an image forming apparatus whose type is for thermally developing a film using such a light beam L exposure process, other than the above-mentioned apparatus using the heating drum, an image forming apparatus is available, which can transport and heat the film A on a heating plate, or which can heat-develop the film A with thermal irradiation during transporting the film A.

Additionally, various image recording apparatuses can be applied to the present invention, e.g. which are a recording apparatus with ink-jet or a thermal transfer recording apparatus with ink-ribbon.

As described above in detail, according to the present invention, there can be obtained an eminent advantage of realizing the image recording apparatus the image recording material alignment function of which such that an image recording material is not deformed even if it is thin and liable to be flexed and the adjustment of which is not time-consuming.

That is, the above advantage can be obtained in the present invention because no force is applied to an image recording material to control the attitude thereof and the position of the image recording material where an image is recorded is adjusted using a software technology based on the result of detection of the transporting position of the image recording material.

What is claimed is:

1. An image recording apparatus comprising:
   an image recording unit which records an image on an image recording material;
   a transporting unit which transports said image recording material whose shape has at a least one side in a predetermined transporting direction;
   a position detecting unit for said image recording material which detects a position of said image recording material in said at least one side along said predetermined transporting direction;
   a reference storage unit storing a corresponding relationship between the position detecting unit and the image recording unit; and
   an image recording position correcting unit which allows said image recording unit to correct an image recording position for said image recording material by referencing the corresponding relationship stored in the reference storage unit and based on result of detection of said position of said image recording material in said at least one side by said position detecting unit so that said image can be recorded correctly at a position to be recorded on said image recording material transported as it is by said transporting unit without correcting said detected position of said image recording material;
   wherein a desired image is recorded on said image recording material at the corrected image recording position by said image recording unit.

2. An image recording apparatus according to claim 1, said position detecting unit detecting an inclination with relative to said transporting direction of said material during transporting from a plurality of portions along said side obtained using said position detecting unit and said image recording position correcting unit correcting a present position of said image recording material depending on said inclination.

3. An image recording apparatus according to claim 1, said position detecting unit having a laser length measuring unit.

4. An image recording apparatus according to claim 1, said position detecting unit having a transmission-type detecting unit or a reflection-type optical detecting unit.

5. An image recording apparatus according to claim 1, said position detecting unit having a potentiometer provided with a lever capable of rotating around a shaft.

6. An image recording apparatus according to claim 1, said image recording material being a rectangular and/or flexible film.

7. An image recording apparatus according to claim 1 being a thermal printer or a laser printer.

8. An image recording apparatus comprising:
   an image recording unit which records an image on an image recording material;
   a transporting unit which transports said image recording material whose shape has at least two sides being opposite in a predetermined transporting direction;

a position detecting unit for said image recording material which is arranged at positions of said at least two sides along said predetermined transporting direction, and which detects a size of said image recording material based on positions of said at least two sides along said predetermined transporting direction; and an image recording position correcting unit which corrects an image recording position for said image recording material based on result of detection by said position detecting unit;

wherein a desired image is recorded on said image recording material at the corrected image recording position by said image recording unit.

9. An image recording apparatus according to claim 8, said position detecting unit having a laser length measuring unit.

10. An image recording apparatus according to claim 8, said position detecting unit having a transmission-type detecting unit or a reflection-type optical detecting unit.

11. An image recording apparatus according to claim 8, said position detecting unit having a potentiometer provided with a lever capable of rotating around a shaft.

12. An image recording apparatus according to claim 8, said image recording material being a rectangular and/or flexible film.

13. An image recording apparatus according to claim 8 being a thermal printer or a laser printer.

14. An image recording apparatus comprising:

an image recording unit which records an image on an image recording material;

a transporting unit which transports said image recording material whose shape is rectangular in a predetermined transporting direction;

a position detecting unit for said image recording material which detects an inclination of said image recording material based on positions of at least two sides along said predetermined transporting direction;

a reference storage unit storing a corresponding relationship between the position detecting unit and the image recording unit; and an image recording position correcting unit which allows said image recording unit to correct an image recording position for said image recording material with reference to the corresponding relationship stored in the reference storage unit and based on the detected inclination so that said image can be recorded correctly at a position to be recorded on said image recording material transported as it is by said transporting unit without correcting said detected inclination of said image recording material;

wherein a desired image is recorded on said image recording material at the corrected image recording position by said image recording unit.

15. An image recording apparatus according to claim 14, said position detecting unit having a laser length measuring unit.

16. An image recording apparatus according to claim 14, said position detecting unit having a transmission-type detecting unit or a reflection-type optical detecting unit.

17. An image recording apparatus according to claim 14, said position detecting unit having a potentiometer provided with a lever capable of rotating around a shaft.

18. An image recording apparatus according to claim 14, said image recording material being a flexible film.

19. An image recording apparatus according to claim 14 being a thermal printer or a laser printer.

20. The image recording apparatus according to claim 1, wherein the image recording position correcting unit corrects the image recording position by referencing sample detection patterns and corresponding ranges for output, stored in the reference storage unit.

21. The image recording apparatus according to claim 1, wherein the image recording position correcting unit compares the detected position of said image recording material with sample detection patterns stored in the reference storage unit, selects output ranges corresponding to a sample detection pattern that matches the detected position, and corrects image recording position for said image recording material based on the selected output ranges.

22. The image recording apparatus according to claim 8, further comprising a reference table storing sample detection patterns and corresponding ranges of output thereby indicating a relationship between the position detecting unit and the image recording unit, wherein the image recording correcting unit corrects the image recording position based on the results of the detection with reference to the detection patterns and the corresponding ranges of output, stored in the reference table.

23. The image recording apparatus according to claim 8, further comprising a reference table storing sample detection patterns and corresponding ranges of output, wherein the image recording correcting unit compares the results of the detection with said sample detection patterns stored in the reference table, selects output ranges corresponding to a sample detection pattern that matches the results of the detection, and corrects said image recording position of said image recording material based on the selected output ranges.

24. The image recording apparatus according to claim 1, wherein the reference storage unit stores a reference table showing corresponding relationship between the position detecting unit and the image recording unit, and wherein the image recording position correcting unit compares the detected position of said image recording material with reference detecting positions of the position detecting unit stored in the reference table, when the detected position matches one of the reference detecting positions, a corresponding recording reference position of the image recording unit is obtained, and corrects the image recording position to the obtained recording reference position.

25. The image recording apparatus according to claim 1, wherein the image recording position correcting unit automatically corrects the image recording position by referencing the corresponding relationship.

26. The image recording apparatus according to claim 1, wherein the image recording correcting unit automatically compares the detected position of said image recording material with reference detecting positions of the position detecting unit stored in the reference storage unit, and based on said comparison, automatically corrects the image recording position to the obtained recording reference position.

27. The image recording apparatus according to claim 8, further comprising: a reference storage unit storing a corresponding relationship between the position detecting unit and the image recording unit, wherein said image recording position correcting unit corrects said image recording position for said image recording material with reference to the corresponding relationship stored in the reference storage unit and based on the result of detection by said position detecting unit.

28. The image recording apparatus according to claim 8, wherein said image recording position correcting unit allows said image recording unit to correct said image recording position for said image recording material based on the result of detection of said positions of said at least two sides by said position detecting unit and said size of said image recording material based on said positions of said at least two sides so that said image can be recorded correctly at the position to be recorded on said image recording material transported as it is by said transporting unit without correcting a position of said image recording material.

* * * * *